United States Patent [19]

Prescott et al.

[11] Patent Number: 4,586,638
[45] Date of Patent: May 6, 1986

[54] MULTI-PURPOSE RACK FOR REMOVABLE MOUNTING TO AN AUTOMOBILE ROOF OR THE LIKE

[75] Inventors: Keith L. Prescott, Cambridge; Robert J. Finnegan, Williston, both of Vt.

[73] Assignee: The Shelburne Corporation, Shelburne, Vt.

[21] Appl. No.: 708,951

[22] Filed: Mar. 6, 1985

[51] Int. Cl.⁴ ............................................. B60R 9/00
[52] U.S. Cl. ................................... 224/329; 224/320; 224/322
[58] Field of Search ............... 224/309, 315, 320, 321, 224/322, 325, 329, 330, 331, 917

[56] References Cited

U.S. PATENT DOCUMENTS

| | | | |
|---|---|---|---|
| 3,109,569 | 5/1963 | Hare | 224/322 |
| 3,381,866 | 5/1968 | Wickett | 224/322 |
| 4,496,089 | 1/1985 | Eklund | 224/329 |

FOREIGN PATENT DOCUMENTS 2950449  6/1981  Fed. Rep. of Germany ...... 224/320

Primary Examiner—Stephen Marcus
Assistant Examiner—David Voorhees
Attorney, Agent, or Firm—Hopgood, Calimafde, Kalil, Blaustein & Judlowe

[57] ABSTRACT

The invention contemplates roof-rack structure comprising (a) an elongate bar of constant external section profile, and (b) two pad-mounted pedestal supports having provision for inserted through-reception of the respective ends of the bar. Each pedestal support includes its own selectively available one-way-engaging clutch action whereby end-inserted displacement of the bar is freely accommodated, and whereby inserted-bar retraction is foreclosed. Each pedestal support also includes its own jack-actuated clamp for secure lateral anchorage to a roof or window edge. Further, a single manual control serves to operate both the clutch action and the lateral clamp, and the manual control is key-lockable when the conditions of bar-clutched engagement and lateral-clamp setting have both been established. The single manual control is subsequently operable, once unlocked, to release both the lateral clamp and the clutched engagement, thus permitting easy and fast disassembly.

20 Claims, 10 Drawing Figures

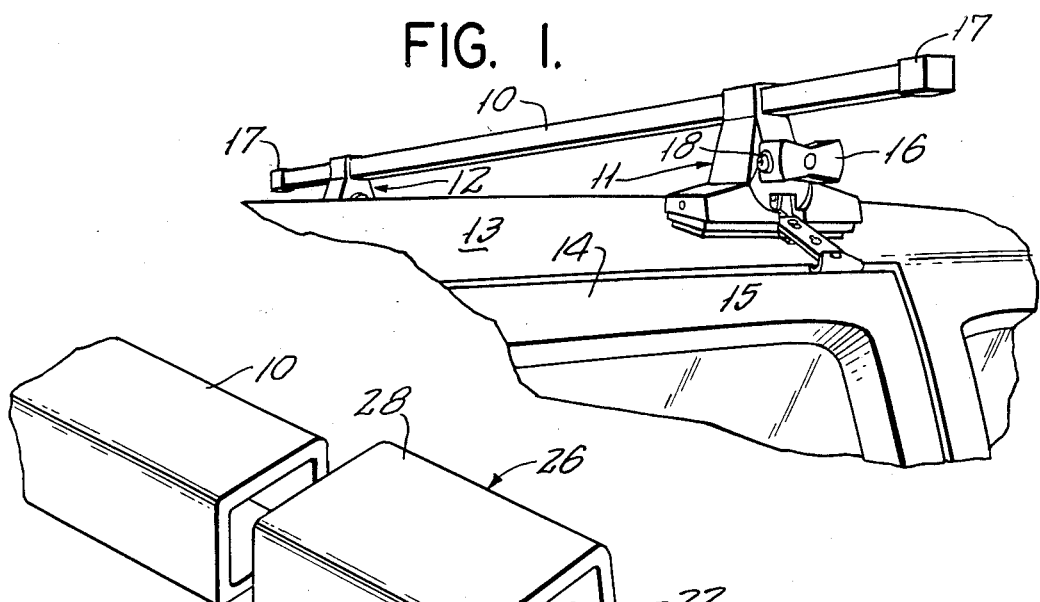
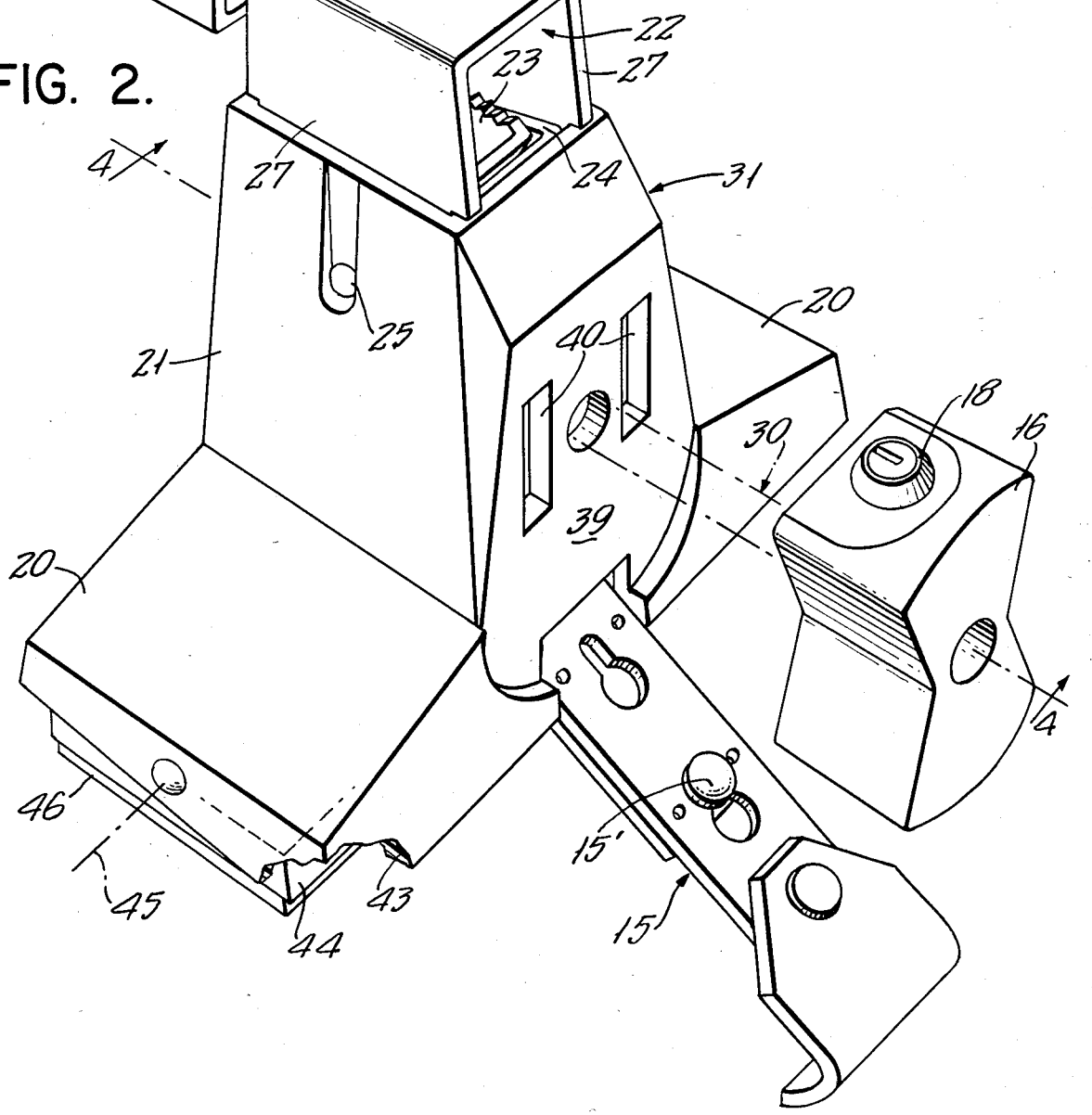

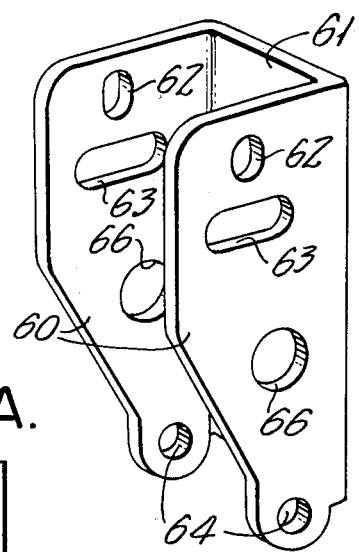
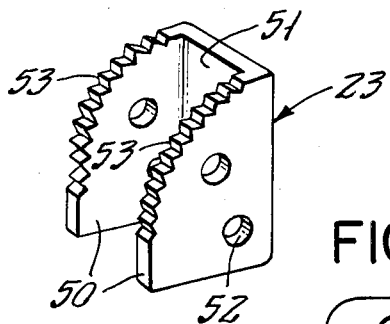
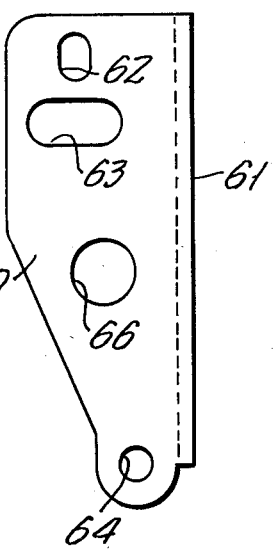
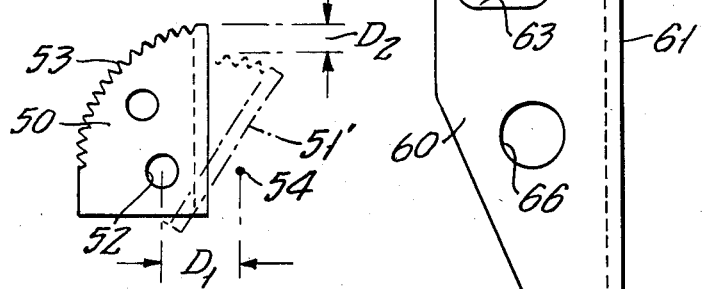
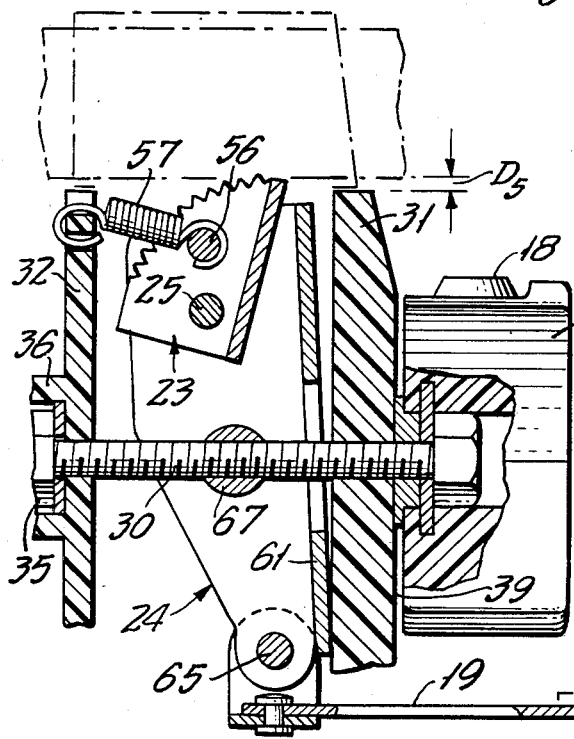
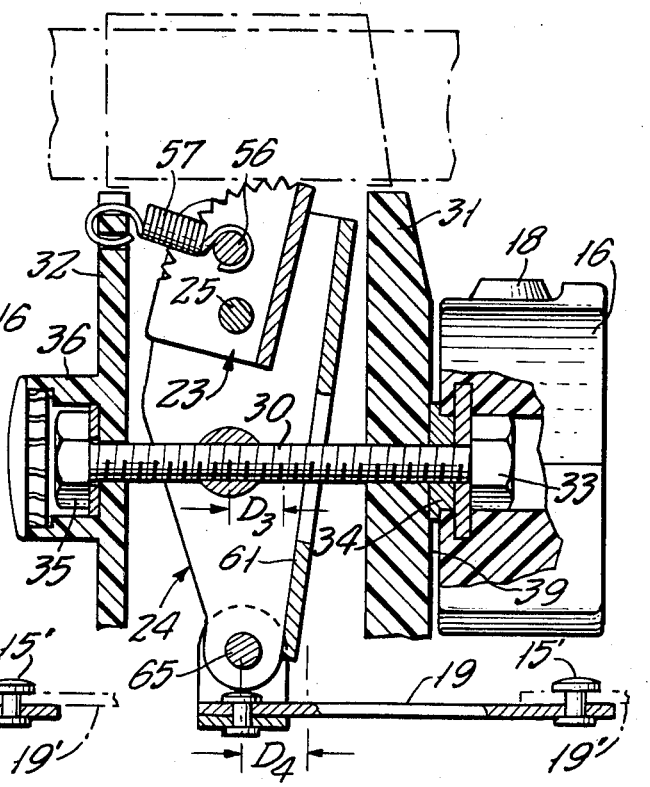

MULTI-PURPOSE RACK FOR REMOVABLE MOUNTING TO AN AUTOMOBILE ROOF OR THE LIKE

BACKGROUND OF THE INVENTION

The invention relates to detachable rack structure for the support of skis, surfboards, and like articles, as on the roof of an automobile.

Prior attachment devices for detachable mounting of racks on automobiles have been of three general types. In a first category, the pedestal or bracket by which the rack is positioned above the roof relies upon seated reference in a rain-gutter; clearly, such a rack is limited as to load by the strength of the rain-gutter, and of course the vehicle must have rain-gutters. Many of today's vehicles have no rain-gutters, or they are of insufficient extent to enable mounting of two racks on a single roof.

A second rack category relies on support pads which seat on the roof, with reliance upon tie-down straps which hook over the edge of the roof. The pads are at a fixed or minimally adjustable spacing, and this represents an undesirable limitation because it often occurs, particularly with the light-weight cars of today, that the roof area of pad support is not a structural area, so that medium-to-heavy loads cannot be tolerated.

The third category is also characterized by reliance on support pads, but these pads are of adjustable width so that the pad can be on or very near the edge of the roof, where the roof can structurally support the load. These racks are difficult to install and require a separate fastening device to establish a desired span between pads, and a separate further fastening device to attach the rack to the car. And only a limited number of different types of cars can accommodate this kind of rack, since roof-edge configurations are so different; commercially available racks are either supplied with one hook for each support bracket, or they are supplied with rigid clamps that are individually designed according to the make and model of each car.

BRIEF STATEMENT OF THE INVENTION

It is an object of the invention to provide improved roof-rack structure of the character indicated, offering a wider range of applicability to vehicles of different makes and models, and also inherently avoiding above-noted limitations of prior constructions.

It is a specific object to achieve the above object with rack-support structure which with a single, lockable actuating motion will not only secure an adjusted rack-support span, appropriate to the particular vehicle dimension, but also will securely anchor the structure to the vehicle.

Another object is to achieve the above objects with basically simple, rugged and foolproof structure which, when locked, offers no invitation to theft or tampering, short of vandalizing destruction.

The invention achieves the above objects and certain further features by providing (a) an elongate bar of constant external section profile, and (b) two pad-mounted pedestal supports having provision for inserted through-reception of the respective ends of the bar. Each pedestal support includes its own selectively available one-way-engaging clutch action whereby end-inserted displacement of the bar is freely accommodated, and whereby inserted-bar retraction is foreclosed. Each pedestal support also includes its own jack-actuated clamp for secure lateral anchorage to a roof or window edge. Further, a single manual control serves to operate both the clutch action and the lateral clamp, and the manual control is key-lockable when the conditions of bar-clutched engagement and lateral-clamp setting have both been established. The single manual control is subsequently operable, once unlocked, to release both the lateral clamp and the clutched engagement, thus permitting easy and fast disassembly.

DETAILED DESCRIPTION

The invention will be illustratively described for a preferred embodiment, in conjunction with the accompanying drawings. In said drawings:

FIG. 1 is a simplified view in perspective of a roof-rack of the invention, in installed condition;

FIG. 2 is an isometric view on an enlarged scale to show one of the end supports of the rack of FIG. 1, in partially exploded array of component parts;

FIGS. 4A and 4B are views similar to FIG. 4, to illustrate relations of parts at different phases of operation;

FIG. 5 is an isometric view of a pawl element of FIGS. 3 and 4, and FIG. 5A is an end elevation thereof;

FIG. 6 is an isometric view of a beam element of FIGS. 3 and 4, and FIG. 6A is an end elevation thereof.

Figure 3:
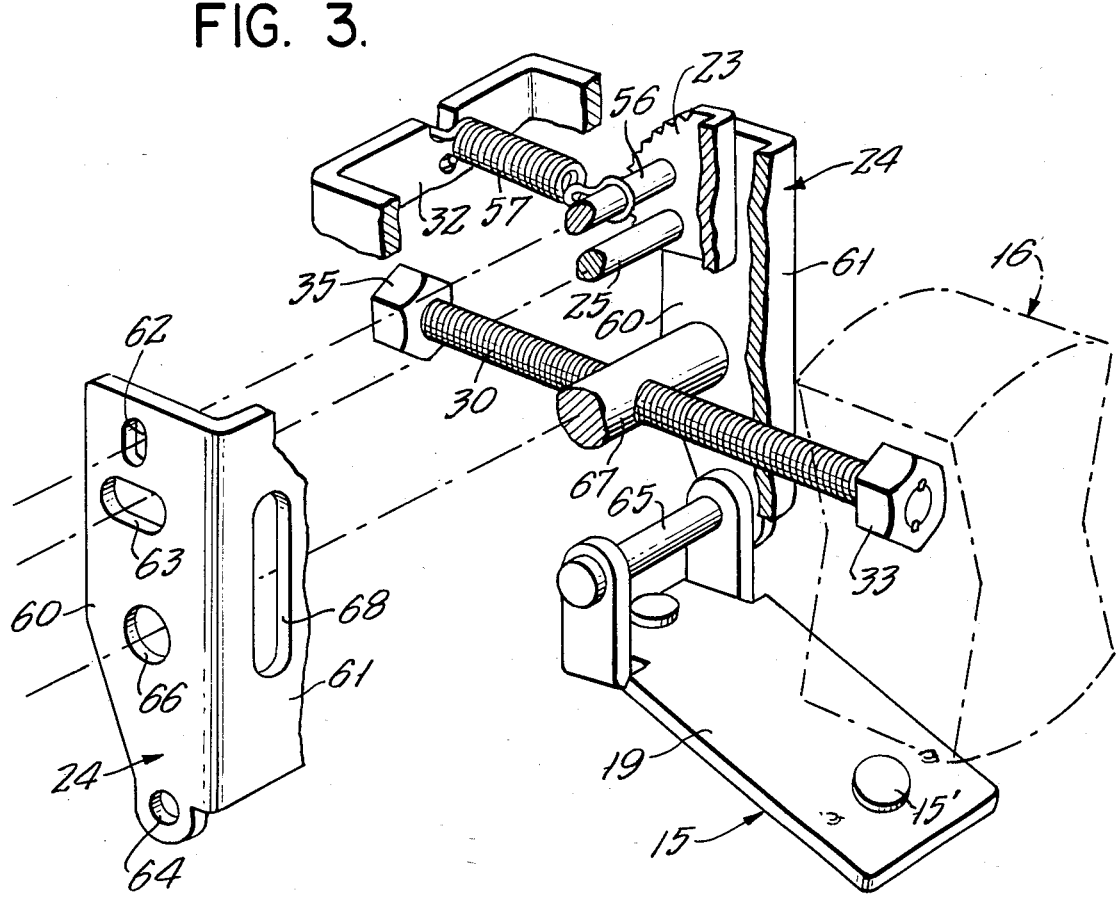
FIG. 3 is a fragmentary, broken-away and exploded isometric view of cooperative internal parts of the support of FIG. 2.

Referring initially to FIG. 1, the invention is shown in application to a rack comprising an elongate bar 10 of constant sectional contour which happens to be rectangular. Bar 10 has been inserted through a transverse opening at the upper end of each of two support pedestals 11–12, having pad contact with spaced lateral-side regions of the roof 13 of an automobile, at the region of the opening for a door 14. A lateral anchor strap 15 has a hooked end, engaged to the nearby edge of the door frame. It will be explained below that a single rotary knob 16, for selective actuation of mechanism contained within pedestal 11 (12), is operative both to lock bar 10 to the pedestal and to develop tensed anchoring force via the strap 15. The ends of bar 10 are shown protectively capped by removable end closures 17, as of elastomeric material, and a key-operated lock 18 affords security for the installed rack by selective denial of rotary action of knob 16.

For convenience in the description which follows, the direction in which bar 10 extends will be referred to as longitudinal, and the outer exposed side of a support pedestal (e.g., 12) will be referred to as the front side, so that knob 16 is on the front side; the back side of a pedestal is the side away from its knob 16.

In FIG. 2, the support 11 is seen to comprise a body having wide base formations 20, integrally formed, as of injection-molded plastic (e.g., Zytel), with a central upstanding pedestal-column portion 21. Provision is made at the upper end of the pedestal-column portion 21 for a transverse opening 22 internally contoured for longitudinal insertion of an end of bar 10 therethrough. Within the opening 22 in FIG. 2, the active contour of a pivoted pawl 23 is partially visible, in nested and retracted position within the upper end of a movable beam 24 which has a control connection to pawl 23, as will be later more fully explained. A transverse pivot pin or shaft 25 is the means of fixedly referencing the pivot axis of pawl 23. In the form shown, the transverse opening 22 is established by an inverted U-shaped bail 26 having two like side-arm panels 27 that are spaced and integrally connected by an upper or back panel 28; the side-arm panels 27 are received in the open upper end of column portion 21, spanning both the pawl 23 and beam 24, and panels 27 are pinned to column portion 21 via the pivot shaft 25. Preferably, the vertical edges of the side-arm panels are in clearance relation with adjacent front and back inner-wall surfaces of the open end of column portion 21, thereby affording bail 26 a limited range of pivoting adaptation to the alignment of an inserted end of bar 10.

The internal mechanism of support 11 relies on a leadscrew 30 driven by knob 16. Leadscrew 30 is journalled for rotation in both the front and back walls 31-32 of column portion 21, and the leadscrew is shown secured against axial displacement, by a front nut 33 (within knob 16) and associated adjacent washer means 34, and by a rear nut 35 (within a cupped rear shell formation 36 of the body of pedestal 11) and adjacent washer means 37. A removable access plug 38 closes the shell formation 36. Preferably, nut 33 is locked to leadscrew 30, as by keying, staking or adhesive bond, and it is also locked to knob 16, which may be of suitable plastic having molded connection to nut 33; adhesive bonding will suffice to retain the set position of the rear nut 35 on leadscrew 30. Alternatively, both nuts 33-35 may be of self-locking variety.

In the region of adjacency to and registry with knob 16, the front wall 31 is shown with a flat surface 39 in a plane normal to the axis of leadscrew support, and this surface 39 is shown characterized by two local indentations or ports 40 on opposite sides of the leadscrew. A key-operable lock 41 carried by knob 16 includes a slide bolt 42 which is enterable in one of the ports 40 when the knob 16 and its mechanism are to be locked against rotation.

The base formations 20 will be understood to be characterized by a downwardly extending peripheral rim 43 defining a downwardly open cavity within which roof-contacting pad structure is accommodated. Such pad structure may comprise a slab of elastomeric material having a bottom surface below the plane of rim 43, but in the form shown a single rectangular rigid plate 44 has articulated connection to widely opposed locales of rim 43, on the transverse axis designated 45; and an elastomeric roof-contacting pad or layer 46 is bonded to plate 44.

The internal mechanism will now be described with particular reference to FIGS. 3 to 6. In its preferred form, pawl 23 is a channel or U-shaped bracket (FIG. 5) wherein two like pawl-side panels 50 are integrally connected by a back panel 51. Openings 52 in the side panels 50 receive shaft 25 and thus establish the body reference for pivoted articulation of the pawl. Pawl 23 is characterized by a generally arcuate friction-cam surface 53 which in FIG. 5 is defined by corresponding outer-edge contours of both side panels 50, friction contact with the underside of bar 10 being achievable via toothed formations in both of these outer-edge contours. In FIG. 5A, it is seen that the geometric center 54 for the arc of these outer-edge contours is eccentric to the extent $D_1$ from the axis of pawl-pivoting. Thus, a difference $D_2$ in vertical elevation of the cam contour 53 results from pivoted displacement of the pawl from its retracted position (see phantom outline in FIG. 5A), with backward inclination of panel 51 (at 51′), to its upwardly assumed position, as indicated by solid lines; it is in the course of pivot action to achieve this rise that pawl 23 jams bar 10 against a reacting stop attributable to the upper back panel 28 of bails 26. A second pair of aligned openings 55 in the side panels 50 retains a pin 56 via which pawl 23 is constantly urged, by a tension spring 57, in the direction toward the solid-line orientation of FIG. 5A, the other end of spring 57 being shown connected to the back wall 32 of column portion 21.

Pin 56 is also the means of vertical lost-motion connection between pawl 23 and the upper end of beam 24, as will now become clear. In FIGS. 6 and 6A, beam 24 is also seen as a channel or U-shaped bracket that has certain freedom of movement within column portion 21. Beam 24 comprises two like beam-side panels 60 integrally connected by a back panel 61, and the U-shape of pawl 23 is nested within the U-shape of beam 24. The upper-end point of vertical lost-motion connection via pin 56 is at aligned short vertical slots 62, the same being seen in FIG. 6A to be located above the horizontal mid-point of aligned horizontal slots 63. The fixed-pivot shaft 25 passes through slots 63 with ample clearance for all necessary freedom of beam movement. Aligned bottom apertures 64 in the beam side panels locate another transverse pin 65, whereby beam 24 has articulated connection to the anchor-strap means 15. Finally, between apertures 64 and slots 63, large circular openings 66 in the beam side panels pivotally accommodate the cylindrical ends of a nut 67 in constant threaded engagement to the leadscrew 30; and a vertical slot in back panel 61 allows clear passage for leadscrew 30. The centers of openings 64–66 are preferably on an alignment with the midpoint of the horizontal slots 63, and this alignment slopes sufficiently away from the plane of back panel 61 to an extent permitting pawl 23 the freedom to tilt backward to the position shown in phantom in FIGS. 4 and 5A, for the retracted condition of the pawl and of the beam.

Operation of the identified structure will now be described, commencing with the retracted condition displayed in FIG. 4, then proceeding with the intermediate condition of FIG. 4A wherein the pawl 23 engages and jams the bar 10, and finally proceeding to the condition of FIG. 4B at which the anchor strap 15 has been fully tensed.

Figure 4:
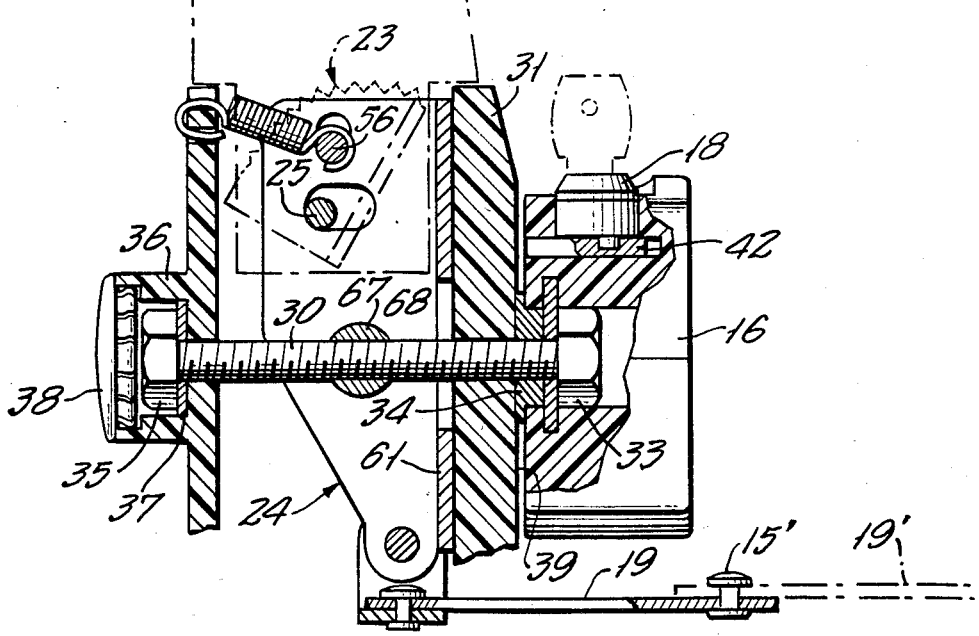
FIG. 4 is a fragmentary view in vertical section, taken at 4—4 in FIG. 2.

In the fully retracted condition of FIG. 4, the back panel 61 of beam 24 has been drawn back, by leadscrew drive of nut 67, into flat vertical abutment with the inner surface of front wall 31, it being understood that lock 18 was first actuated to withdraw bolt 42 from anti-rotational engagement at one of the front-wall ports 40 (see FIG. 2). It is preferred that the threaded advance of leadscrew 30 be left-handed, so that knob 16 should be rotated in the clockwise sense (as viewed from the front), in order to drive nut 67 away from the retracted position of FIG. 4. Initial advance of nut 67 on leadscrew 30 allows spring 57 to elevate pawl 23 and to draw the upper end of beam 24 away from front wall 31. In the course of this motion, beam 24 pivots counter-clockwise (in the sense of FIG. 4) and is spring-loaded to drag the lower end of back panel 61 (as a first fulcrum) on the inner surface of body wall 31. As pawl 23 is thus urged and allowed to elevate, there comes a time when its cam profile 53 engages the underside of bar 10, and continued advancing rotation of the leadscrew 30 allows a preliminary jammed relation to develop. The relation of parts is then as displayed in FIG. 4A.

Once the pawl-jammed condition of FIG. 4A is achieved, the vertical side walls of vertical slots 62 coact with pin 56 to establish a new fulcrum point for beam 24. Thus, with continued advancing leadscrew drive of nut 67, beam 24 is caused to rotate in the clockwise sense (as viewed in FIG. 4A), and therefore an amplified right-to-left displacement is imparted to the lower-end pin connection (65) to the anchor strap 15. The anchor strap ultimately becomes fully tensed against its hooked connection to the frame of door 14, and this juncture is illustratively depicted in FIG. 4B, wherein it is seen that for a total displacement $D_3$ of nut 67, a total anchor-tensing displacement $D_4$ has been achieved. The knob 16 has thus fully jammed bar 10 and has fully tensed the anchor strap 15, and the knob may be rotated to a bolt-setting position for locking by means 18.

When it is desired to remove the rack from installed condition (FIG. 4B), and after the key-operated bolt 42 has been retracted, counterclockwise knob rotation first retracts the lead nut 67, thus relieving tension in the anchor strap 15. This relief is fully established when the bottom end of the beam panel 61 develops fulcrum contact with the inner surface of front wall 31 (FIG. 4A). Continued counterclockwise knob rotation further retracts the lead nut 67 and forces beam 24 into clockwise rotation, thus applying clockwise torque to pawl 23 (via the connecting pin 56). This torque imparts clockwise rotation to pawl 23 and its jam against bar 10 is relieved. Full knob rotation in this pawl-retracting direction restores the back panel of beam 24 to full contact with front wall 31, whereupon pawl 23 has resumed its fully retracted position (FIG. 4).

It should be noted as a feature of the invention that in and near the FIG. 4A relation of parts, the action of pawl 23 is that of a one-way-engaging clutch element. In this circumstance, bar 10 is freely longitudinally slidable through bail passage 22 in the insertion direction, so as to project the inserted bar end as far as possible or desired in front of the front wall 31. On the other hand, any attempted retraction of bar 10 in the rearward direction is foreclosed by the one-way-engaging clutch action of pawl 23, jamming against the underside of bar 10.

It will be seen that the described invention achieves all stated objects. The single knob 16 controls two different kinds of action in a sequence wherein beam 24 is caused to undergo different directions of partial rotation as the instantaneous fulcrum point is caused to shift from one to the other end of the beam. Selective availability of the indicated one-way-engaging clutch action has the practical significance that in initially placing a bar 10 with its two pedestals 11'12 on a roof where each of the pedestals must rest on a sloping surface, the one-way-engaging clutch action at both pedestals will assure against pedestal slippage on the roof or with respect to the bar; and the pivot action of the roof pad 44/46 about axis 45 enables free local adaptation to roof slope. Thus, the entire assembly may be more easily and more precisely applied to the car, and removal is also a simple, single-control operation.

As a further feature, it should be noted that the knob 16 is field-serviceable, even though it is preferably permanently united to the leadscrew 30. The plug or cap 38 of an installed pedestal 11 (12) is normally hidden from view, being at the back of the back wall 32 and, of course, between bar 10 and the roof 13. But a screwdriver or pen knife can pry off the plug 38, giving access to nut 35. If, as is preferred, nut 35 is of self-locking nature or is adhesive-bonded to leadscrew 30, and if (as is also preferred) there is such close radial clearance between nut 35 and the bore of shell 36 as to deny access to a conventional wrench socket, then servicing access can at least be afforded for a specially socketed wrench that is designed for reception in the unconventional clearance. Ordinarily, such servicing access is only needed in the event of a malfunction of the key-operated lock, in which case, replacement of the knob/lock/leadscrew subassembly is desired. But, importantly, it is noted that the preferrred small clearance relation at 35/36 is such as to foreclose unauthorized access to a locked structure, using conventional tools.

Quite aside from the described action within the pedestal structure, it should be noted from FIGS. 2 and 4, that the anchor strap 15 is preferably of two parts, a first part 19 having permanently pinned connection to the lower end of beam 24, and carrying a beaded stud 15' at its outer end. The second part 19' is a hook strap having two spaced key-hole apertures, whereby hook offset from the point of connection to beam 24 is selectable, depending upon the key-hole at which the first and second parts are engaged via stud 15'. The fact that part 19' is removably connectable to part 19 also means that part 19' may be one of a variety of specially formed hook parts, each best adapted for the peculiar requirements for locally anchoring to special makes and models of cars.

While the invention has been described in detail for a preferred embodiment, it will be understood that modifications may be made without departing from the scope of the invention.

What is claimed is:

1. Roof-mountable rack structure, comprising an elongate bar of uniform external section contour, and at least two like pedestal mounts adapted for roof-stabilized support of longitudinally spaced regions of said bar, which regions are short of the respective outer ends of said bar; each mount comprising a body having a roof-loading base portion and a pedestal-column portion extending upwardly thereof to a bar-supporting end, the bar-supporting end of each mount being characterized by a transverse opening sized and contoured for running-clearance longitudinal reception and through passage of one end of said bar, a one-way-engaging clutch element shiftably carried at the bar-supporting end of said pedestal column portion and normally spring-urged in the direction of engagement to that part of the bar which is embraced by the transverse opening, the direction of one-way-engagement being to lock against bar retraction from and to admit bar-insertion through the transverse opening; said pedestal-column portion having an anchor-access port near said base portion and open to the side of said mount from which the inserted bar end projects, an anchor strap extending through said port and having means at its outer end for roof-related anchoring reference, a vertically elongate beam movable within said column portion, said beam having an upper-end control connection to said clutch element and a lower-end connection to said strap, and body-referenced transversely acting jack mechanism having an articulated connection to said beam at a location intermediate said upper and lower end connections.

2. Roof-mountable structure, comprising an elongate bar of uniform external section contour, and at least two like pedestal mounts adapted for roof-stabilized support of logitudinally spaced regions of said bar, which regions are short of the respective outer ends of said bar; each mount comprising a body having a roof-loading base portion and a pedestal-column portion extending upwardly thereof to a bar-supporting end, the bar-supporting end of each mount being characterized by a transverse opening sized and contoured for running-clearance longitudinal reception and through passage of one end of said bar, a one-way-engaging clutch element shiftably carried at the bar-supporting end of said pedestal column portion and normally urged in the direction of engagement to that part of the bar which is embraced by the transverse opening, the direction of one-way-engagement being to lock against bar retraction from and to admit bar-insertion through the transverse opening; said pedestal-column portion having an anchor-access port near said base portion and open to the side of said mount from which the inserted bar end projects, an anchor strap extending through said port and having means at its outer end for roof-related anchoring reference, a vertically elongate beam movable within said column portion, said beam having an upper-end control connection to said clutch element and a lower-end connection to said strap, and body-referenced transversely acting jack mechanism having an articulated connection to said beam at a location intermediate said upper and lower end connections, said jack mechanism comprising transversely extending lead-screw means journalled in said pedestal-column portion for axially retained rotation, and a screw-engaged nut connected to said beam.

3. Roof-mountable structure according to claim 2, in which at least one end of said leadscrew means extends outside said mount and includes means for manual rotary actuation thereof.

4. Roof-mountable structure according to claim 3, in which said pedestal-column portion and said manual-actuation means are characterized by adjacent overlapping faces in close-clearance relation, and key-operated bolt means coacting between said pedestal-column portion and said manual-actuation means within the lapping region of said faces for selectively locking a manually actuated position of said nut along said leadscrew means.

5. As an article of manufacture, a pedestal mount adapted for use in multiple to provide roof-stabilized support of longitudinally spaced regions of an elongate bar of uniform external section contour, said mount comprising a body having a roof-loading base portion and a pedestal-column portion extending upwardly to a bar-supporting end, the bar-supporting end of said mount being characterized by a transverse opening sized and contoured for running-clearance longitudinal reception and through-passage of a bar of such section contour, said opening extending from a back side to a front side of said pedestal-column portion, a one-way-engaging clutch element shiftably carried at the bar-supporting end of said pedestal-column portion and normally spring-urged in the direction of locally reducing the section area of said contour for one-way engagement with an inserted bar, the direction of one-way engagement being to lock against bar retraction from front to back sides and to admit bar insertion in the direction from back to front sides of said pedestal-column portion, said pedestal-column portion having a front-side anchor-access port near said base portion, anchor means extending through said port, a vertically elongate beam movable within said pedestal-column portion, said beam having an upper-end control connection to said clutch element and a lower-end connection to said anchor means, and body-referenced transversely acting jack mechanism having an articulated connection to said beam at a location intermediate said upper and lower end connections.

6. As an article of manufacture, a pedestal mount adapted for use in multiple to provide roof-stabilized support of longitudinally spaced regions of an elongate bar of uniform external section contour, said mount comprising a body having a roof-loading base portion and a pedestal-column portion extending upwardly to a bar-supporting end, the bar-supporting end of said mount being characterized by a transverse opening sized and contoured for running-clearance longitudinal reception and through-passage of a bar of such section contour, said opening extending from a back side to a front side of said pedestal-column portion, a one-way-engaging clutch element shiftably carried at the bar-supporting end of said pedestal-column portion and normally urged in the direction of locally reducing the section area of said contour for one-way engagement with an inserted bar, said one-way-engaging clutch element being a friction pawl pivotally mounted to and within said pedestal-column portion, said pawl having a generally arcuate friction-cam surface which is eccentric to the pawl-pivot axis, and said friction-cam surface producing varying degrees of local section-area contour reduction of said transverse opening as a function of pivoted angular orientation of said pawl, the direction of one-way engagement being to lock against bar retraction from front to back sides and to admit bar insertion in the direction from back to front sides of said pedestal-column portion, said pedestal-column portion having a front-side anchor-access port near said base portion, anchor means extending through said port, a vertically elongate beam movable within said pedestal-column portion, said beam having an upper-end control connection to said clutch element and a lower-end connection to said anchor means, and body-referenced transversely acting jack mechanism having an articulated connection to said beam at a location intermediate said upper and lower end connections.

7. The article of claim 6, in which said friction-cam surface is above the pawl-pivot axis and the cam rise of said surface is such as to increase the intrusion of said friction-cam surface into said transverse opening, for the front-to-back direction of pawl rotation.

8. The article of claim 6, in which said pedestal-column portion has an upwardly open end, with the friction-cam surface of said pawl having varying degrees of projection above said open end, as a function of pivoted angular orientation of said pawl; and a generally U-shaped bail member having two downwardly extending side-arm panels integrally connected by an upper back panel, said side-arm panels spanning said pawl and extending into said open end and being connected to said pedestal-column portion on the pawl-pivot axis, said side-arm panels being of sufficient length to so position said upper back panel above said open end as to thereby define said transverse opening, vertically between said open end and said back panel, and laterally between said side-arm panels.

9. The article of claim 6, in which said friction-cam surface is characterized by an arcuate succession of multiple tooth formations.

10. The article of claim 5, in which said upper-end control connection is characterized by lost-motion in the generally vertical direction.

11. The article of claim 6, in which said pawl is a one-piece bracket of generally U-shape wherein two like pawl-side panels are integrally connected by a back panel, the pivotal axis of said pawl being through said side panels, and the generally arcuate friction-cam surface being established by like outer-edge contours of said side panels.

12. The article of claim 11, in which said beam is a one-piece bracket of generally U-shape wherein two like beam-side panels are integrally connected by a back panel, the U-shape of said pawl being nested and movable within the U-shape of said bracket.

13. The article of claim 12, in which said back panel has a vertically elongate slot, and in which said jack mechanism includes a lead screw passing through said slot and journalled for rotation in the front and back sides of said pedestal-column portion.

14. The article of claim 13, in which said jack mechanism further includes a lead-nut engaged to said lead screw between said beam-side panels, and in which said nut is pivotally journalled in both said beam-side panels.

15. The article of claim 13, in which said lead screw has an actuating end extending through the front side of said pedestal-column portion, and an external actuating knob secured to said actuating end.

16. The article of claim 15, in which a key-operable lock bolt is carried by said knob, with the bolt thereof selectively actuable into antirotational engagement with a part of said pedestal-column portion.

17. The article of claim 5, in which said base portion is characterized by a downwardly extending peripheral rim which defines a downwardly open cavity, and a load-distribution pad carried by said base portion within said cavity and having a roof-engageable bottom surface which is below said peripheral rim.

18. The article of claim 17, in which said load-distribution pad comprises a plate having pivotally articulated suspension from said peripheral rim.

19. The article of claim 18, in which a layer of elastomeric material is carried by the underside of said plate.

20. The article of claim 15, in which said lead screw is left-hand threaded, whereby clamp-setting action is via clockwise knob rotation, and clamp-release action is via counter-clockwise knob rotation.

* * * * *